May 2, 1961 A. W. GUNNING 2,982,590
CYLINDER CONSTRUCTION
Filed March 30, 1959
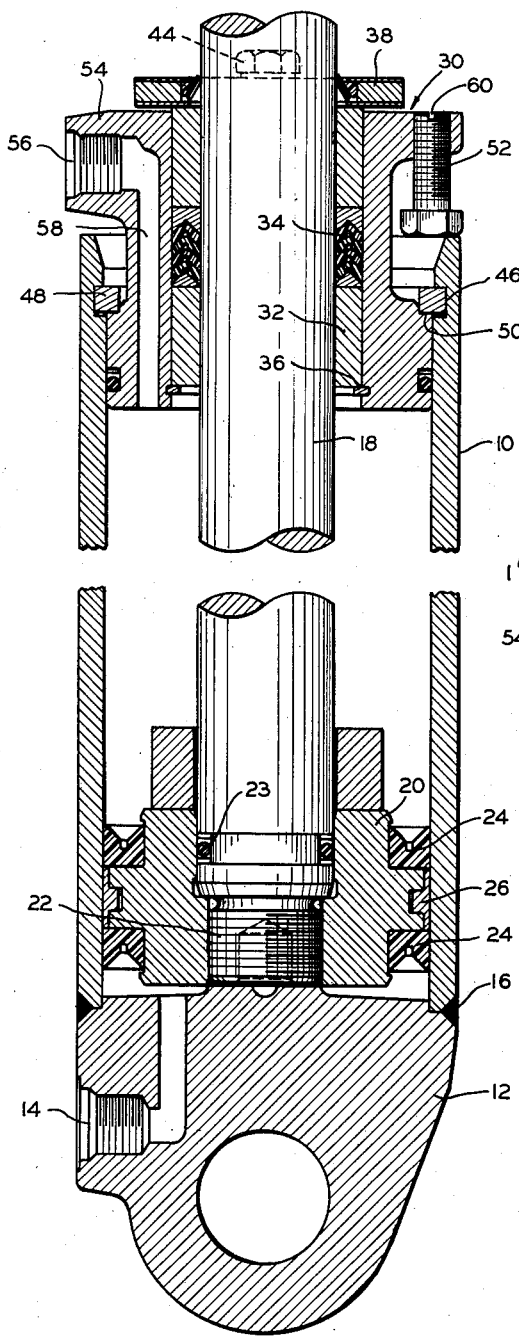
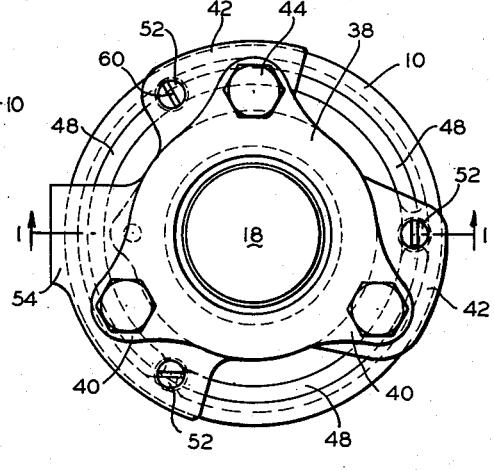
INVENTOR.
ALFRED W. GUNNING
BY
ATTORNEY

United States Patent Office 2,982,590
Patented May 2, 1961

2,982,590

CYLINDER CONSTRUCTION

Alfred W. Gunning, Richland, Mich., assignor to Clark Equipment Company, a corporation of Michigan Filed Mar. 30, 1959, Ser. No. 802,969

9 Claims. (Cl. 309—2)

This invention relates to an actuator cylinder construction, and more particularly is concerned with a generally improved and economical end closure arrangement for the piston rod end of the cylinder.

The present invention contemplates a cylinder construction in which the end through which the piston rod projects is adapted to be closed by piston rod guide means which is immovably locked in position by a novel combination of an internal retainer ring and holding members interconnecting an upper portion of the guide means and the end of the cylinder for rigidly fixing the position of the guide means relative to the cylinder end, all essentially within the space envelope defined by the outer diameter of the cylinder.

The object of the invention is to generally improve piston rod guide means and the association thereof with a cylinder construction of the type contemplated.

The particular construction and operation of the device hereof will be apparent to those skilled in the art from a consideration of the drawing in which Figure 1 is a sectional view taken on line 1—1 of Figure 2, and Figure 2 is a view in elevation taken from the upper end of Figure 1.

Referring now in detail to the drawing, the cylinder construction consists of a sleeve member 10 which, at one end, is provided with a head closure member 12 having a port 14 therein by means of which fluid under pressure may be introduced into the interior of the cylinder. Preferably, the cylinder sleeve 10 and the head member 12 are secured together rigidly by means of an annular ring weld indicated at 16.

Disposed within the cylinder is a piston rod 18 having a piston head 20 receiving the end of the rod and secured thereto by means of a threaded connection 22. A sealing ring 23 is provided to prevent leakage between the piston rod and the piston head, and a pair of annular cup-shaped sealing members 24 are mounted in recesses formed in the outer periphery of the piston head and in sealing relation to the inner cylinder wall. A wear ring is shown in section at 26.

At the opposite end of the cylinder, there is provided a piston rod guide assembly consisting of the guide means 30 having a liner or sleeve 32 and associated packing seal means 34 closely embracing the surface of the piston rod 18. A snap ring 36 supports the liner 32 which is held rigidly in position, as shown, by means of an upper plate member 38 through which passes piston rod 18. Plate member 38 includes projecting ears 40 which extend radially outwardly beyond the liner 32 and are secured to upper flanged portions 42 of guide means 30 by means of bolts 44. An internal annular recess 46 is formed in the cylinder sleeve 10 adjacent the upper end thereof, which, following assembly of guide member 30 in cylinder sleeve 10, is adapted to receive a segmental ring 48 preferably composed of three arcuate members which may be made of seamless steel tubing or the like, and which are disposed in the annular recess 46 as indicated. An annular shoulder portion 50 of guide means 30 is adapted to abut and tightly engage the radially inwardly extending shoulder portion of ring 48 as described hereinafter.

A plurality of inverted bolt members 52 threadedly engage flange portions 42 of head 30, and are forcibly engageable at the head ends thereof with the upper edge portion of cylinder sleeve 10. It will be understood that three or more such bolts may be provided; three has been found to be adequate in practice. A boss portion 54 is formed in the one side of guide member 30 and provides a port 56 and passageway 58 for conducting fluid into and from the cylinder sleeve 10, it being understood that the cylinder assembly is intended to be double-acting in operation.

For purposes of illustration, the recess 46, as shown, is somewhat larger in vertical dimension than is the segmental ring 48. This difference in dimension, which may normally occur in the manufacturing process, does not, in my construction, affect the rigidity of guide means 30 in cylinder sleeve 10. It will be noted that the rigidity of the guide means does not depend upon a tight fitting engagement of ring 48 in recess 46, as is true in some prior constructions, for the reason that the ring 48 is tightly held between shoulder 50 of the guide means and the upper shoulder of recess 46. Inverted bolt members 52 provide the means whereby the latter relationship exists.

In the final stage of assembly of my construction, it will be understood that bolt members 52 will be turned outwardly against guide means 30 whereby to force the guide means upwardly until shoulder 50 thereof tightly engages the lower inner portion of ring 48, thereby forcing the upper side of ring 48 into tight abutment with the aforesaid upper shoulder of recess 46. A slot 60 is provided in the threaded end of each bolt 52, whereby the bolts may be turned from either the head or threaded ends thereof. If, for example, it is desired to tighten guide means 30 as aforesaid, assuming bolts 52 have a right-hand thread, it is merely necessary to turn the bolts in a clockwise direction, as seen from the slotted end thereof, whereby the reaction force is taken by the cylinder sleeve 10 forcing shoulder 50 of guide member 30 into tight abutment with ring 48.

It is of importance to note that my novel construction further enables the port 56 and passage 58 to be formed in the guide means 30, which avoids manufacturing problems inherent in many prior constructions wherein fluid was conducted first through the wall of the cylinder and thence through a passageway formed in the lower portion of guide means.

It will also be appreciated by those skilled in the art that the significant advantages which inhere in my construction include an arrangement whereby the space requirement at the piston rod end of the cylinder is minimized while, at the same time, the construction is substantially simplified and less costly to manufacture than prior known cylinder constructions.

I am aware that various changes may be made in certain details of the present construction, and I therefore do not intend to be limited except as by the scope of the appended claims.

I claim:

1. A cylinder construction comprising a cylindrical sleeve, guide means closing one end of the sleeve and having a piston rod extending therethrough, an annular inwardly opening recess in said sleeve, a ring partially seated in said recess providing an abutment for said guide means, a plurality of tightening members supported by the end of said sleeve and extending into the upper end of said guide means, said tightening members being adapted to positionally fix and hold said guide means in abutment with the lower side portion of said ring and to fix and hold an opposite side portion of said ring in abutment with one side of said recess.

2. A cylinder construction comprising a cylindrical sleeve, guide means closing one end of the sleeve and having a piston rod extending therethrough, an annular inwardly opening recess in said sleeve adjacent the said closed one end thereof, a lower shoulder portion on said guide means, a ring partially seated in said recess providing an abutment for said shoulder portion, a plurality of tightening members supported by the end of said sleeve and extending vertically into an upper end portion of said guide means, and port means in the upper end portion of the guide means communicating with the interior of said sleeve, said tightening members being adapted to positionally fix said shoulder portion in abutment with the lower side portion of said ring and to fix an opposite side portion of said ring in abutment with one side of said recess.

3. A cylinder construction as claimed in claim 2 wherein the upper end portion of the guide means lies substantially within the space envelope of the outer diameter of the cylinder sleeve.

4. An actuator cylinder construction comprising a cylinder sleeve having a plunger bore therein, a guide means in said bore at one end of the cylinder sleeve, said sleeve provided with an internal groove therein adjacent said guide means, a retainer in said groove providing an abutment for said guide means, a plurality of upwardly extending securing elements supported from the end of said sleeve and located in peripherally spaced relation to each other, said securing elements being screw threadedly connected to the upper end of the guide means such that turning of the securing elements in one direction causes reactive thrust to be exerted against the abutting end of the sleeve and forces the guide means axially outwardly of the cylinder into abutting relation with said retainer.

5. A cylinder construction as claimed in claim 4 wherein each securing element comprises an inverted bolt means, said bolt means having its head portion end in abutment with said sleeve end.

6. A cylinder construction as claimed in claim 5 wherein the opposite end of each bolt means defines a tool receiving aperture whereby said bolt means may be operated from either end.

7. A cylinder construction as claimed in claim 5 wherein the upper end of said guide means includes ported means in communication with the interior of the cylindrical sleeve, said upper end of the guide means being located substantially within the space envelope of the outer diameter of the sleeve.

8. In combination, a cylindrical sleeve having a piston and piston rod therein, an annular inwardly opening recess adjacent an open end of the sleeve, guide means piloted in said end of the sleeve and receiving said piston rod which extends therethrough, a retainer in said recess providing an abutment for said guide means, said guide means having an enlarged upper end portion, a plurality of elements screw-threaded in said enlarged end portion and abutting the end of the sleeve for urging the guide means into abutting relation with one side of the retainer and the retainer into abutting relation with one side of the recess, said guide means providing cylindrical bearing means intermediate the enlarged end portion and the piston rod, and means overlying the enlarged end portion and secured thereto for retaining the bearing means in fixed position.

9. A construction as claimed in claim 8 wherein port means is provided in said enlarged end portion, said port means being in communication with the interior of the sleeve, said enlarged end portion of the guide means being substantially within the space envelope defined by the outer diameter of the sleeve.

References Cited in the file of this patent

UNITED STATES PATENTS

| | | |
|---|---|---|
| 2,480,633 | Christensen | Aug. 30, 1949 |
| 2,518,787 | Huhtala | Aug. 15, 1950 |
| 2,662,663 | Schmidt | Dec. 15, 1953 |
| 2,719,766 | Densmore | Oct. 4, 1955 |
| 2,849,263 | Johnston | Aug. 26, 1958 |
| 2,890,917 | Prince | June 16, 1959 |